United States Patent [19]

Evers

[11] Patent Number: 4,480,417
[45] Date of Patent: Nov. 6, 1984

[54] GLASS PANE FRAMED BY A U-SHAPED PROFILE RAIL

[75] Inventor: Manfred Evers, Mettmann, Fed. Rep. of Germany

[73] Assignee: Vereinigte Glaswerke GmbH, Aachen, Fed. Rep. of Germany

[21] Appl. No.: 289,144

[22] Filed: Aug. 3, 1981

[30] Foreign Application Priority Data

Aug. 16, 1980 [DE] Fed. Rep. of Germany ....... 3030948

[51] Int. Cl.³ .............................................. E04F 15/14
[52] U.S. Cl. ....................................... 52/400; 52/823; 428/83
[58] Field of Search ................. 52/307, 400, 403, 413, 52/306, 309.12, 733, 740, 390, 391, 823; 428/34, 38, 81, 83; 296/146; 49/490, 502

[56] References Cited

U.S. PATENT DOCUMENTS

| 2,114,473 | 4/1938 | Labra ..................................... 52/307 |
| 2,119,690 | 6/1938 | Torstenson ............................ 52/307 |
| 2,931,270 | 4/1960 | Pennell ................................... 52/306 |
| 3,340,224 | 9/1967 | Sherman et al. ................... 52/400 X |
| 3,881,043 | 4/1975 | Rieser et al. ............................ 428/81 |
| 3,895,859 | 7/1975 | Yoshida et al. ................. 350/276 R |
| 4,006,569 | 2/1977 | Kain ........................................ 52/397 |

FOREIGN PATENT DOCUMENTS

| 821547 | 10/1951 | Fed. Rep. of Germany . |
| 884416 | 7/1953 | Fed. Rep. of Germany . |
| 1025607 | 3/1958 | Fed. Rep. of Germany . |
| 2040258 | 3/1971 | Fed. Rep. of Germany . |
| 7047196 | 4/1971 | Fed. Rep. of Germany . |
| 2361669 | 7/1974 | Fed. Rep. of Germany . |
| 7919411 | 10/1979 | Fed. Rep. of Germany . |
| 430146 | 8/1967 | Switzerland . |
| 644849 | 10/1950 | United Kingdom . |

Primary Examiner—Carl D. Friedman
Assistant Examiner—Naoko Nakazawa
Attorney, Agent, or Firm—Pennie & Edmonds

[57] ABSTRACT

This invention discloses an improved glass pane framed by a U-shaped profile rail wherein the adhesion of the glass pane to the clamping rail is significantly increased. At least one side of the marginal area of the glass pane framed by the U-shaped profile rail is provided with a group of raised bodies which are anchored into the surface of the glass and impress themselves into a layer of elastic deformable material that lies between the glass pane and the clamping rail.

7 Claims, 2 Drawing Figures

GLASS PANE FRAMED BY A U-SHAPED PROFILE RAIL

TECHNICAL FIELD

This invention relates to an improved glass pane framed by a U-shaped profile clamping rail in which the connection between the pane and the rail is strengthened so that the risk of disengagement of the clamping rail from the glass pane is eliminated or substantially reduced.

BACKGROUND ART

Glass panes framed along an edge by a U-shaped profile clamping rail are employed for many purposes, but are used to a particularly extensive degree for sliding door constructions, as for example in the case of shower separations, or as lowerable side windows in motor vehicles. In sliding door constructions, the glass pane is mounted suspended, so that the natural weight of the glass pane must be carried by the clamping profile. In the case of lowerable side windows of cars, so-called "crankable windows," the clamping rail is disposed along the lower edge of the glass pane. For various reasons the glass panes of such crankable windows may be hard to shift in the lateral guide rails. When this occurs, great forces are transferred to the glass pane from the clamping rail. At the same time, the clamping rail may be pulled off the edge of the glass pane by the shifting mechanism acting on the clamping rail.

This invention is aimed at improving the connection between the glass pane and a pressed-on clamping rail so that the danger of the disengagement of the clamping rail from the glass pane is eliminated or significantly decreased.

GENERAL DESCRIPTION OF THE INVENTION

According to the invention, the problem of possible disengagement of the clamping rail from the glass pane is decreased or avoided by providing the glass pane in the marginal area covered by the clamping profile with a plurality of raised sections or bodies on at least one side of the marginal area and in contact with an intermediate elastic material.

Although the extraordinarily smooth surface of a standard glass pane has a very low friction coefficient, the high adhesive friction area created by the invention results in a considerable improvement of the adhesion of the clamping profile to the glass pane.

Broadly, the invention comprises a glass pane having a U-shaped profile rail pressed onto the edge of the glass, with an intermediate strip or profile made of elastic deformable material. The glass pane has a surface comprising elevated sections in the area of contact of the pressed-on U-shaped profile rail which deform the intermediate elastic layer and provide a considerably improved connection between the glass pane and the clamping rail.

The raised bodies can be of fired-on ceramic material, are preferably striplike or punctiform in shape and have a sufficient height to significantly increase the strength of the connection between the glass pane and the U-shaped profile rail. The bodies impress themselves into the elastic deformable material between the glass pane and the clamping rail.

DESCRIPTION OF THE PREFERRED EMBODIMENTS

Figure 1:
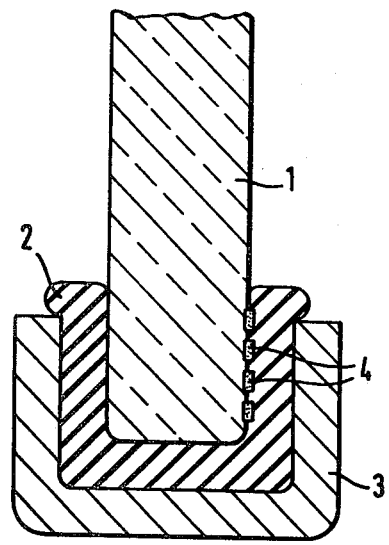
FIG. 1 is a schematic view of a cross section through a marginal area of a glass pane framed according to the invention.
Figure 2:
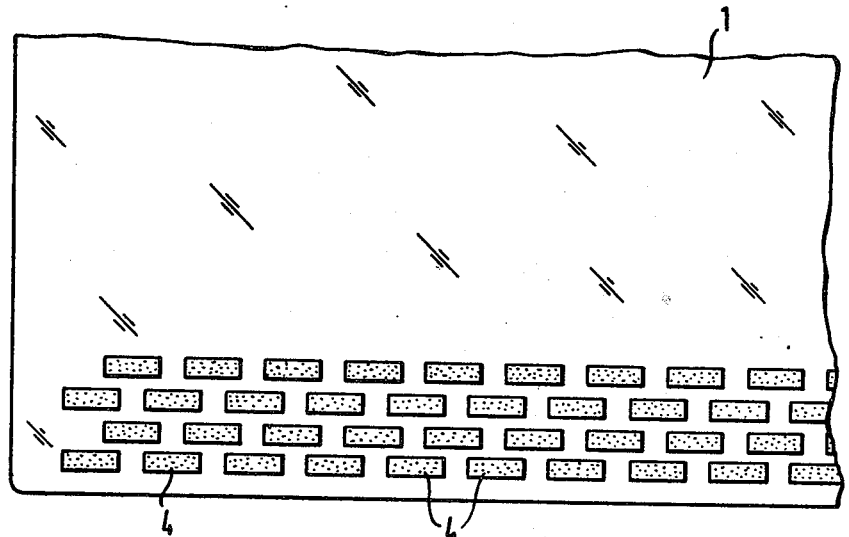
FIG. 2 is a schematic view of a glass pane developed according to the invention, with a partial view of a marginal area.

FIGS. 1 and 2 illustrate a glass pane 1 made of thermally prestressed silicate glass, of approximately 4 mm thickness, to be used as a lowerable side window pane ("crankable pane") in a motor vehicle. A conventional metal clamping rail 3, which is U-shaped in its cross section, is pressed onto the lower marginal area of the glass pane with the interposition of an elastically deformable intermediate layer 2. The elastic layer serves for the transfer of the forces exerted by the lifting and lowering mechanism to the glass pane 1. The intermediate layer is preferably of rubber or of a rubberlike material with similar characteristics.

At the level of the marginal area covered by the metal rail 3 and the intermediate layer 2, the glass pane 1 is provided with raised stripshaped bodies 4 which are disposed in parallel to the edge of the pane. The stripshape bodies impress themselves into the intermediate layer of elastically resilient material lying between the glass pane and the clamping profile. Their function is to prevent the sliding of the intermediate layer in the direction of the application of stress.

The stripshaped bodies preferably have a width between about 0.5 mm and 2 mm and a height between about 0.2 mm and 0.5 mm. The bodies can be made of fired-on ceramic material and can be applied to the glass pane in a desired pattern by various methods, such as a silk-screening process. The ceramic strips can be burnt into the surface of the glass pane during the course of the thermal prestressing process for the glass pane carried out at a temperature of approximately 600° C.

FIG. 2 illustrates a glass pane developed according to the invention, with a partial view of the marginal area. The stripshape bodies 4 can be developed as short, straight line elevations or as continuous long line-like elevations. They may have any arbitrary geometric shape, as long as an essential part of these elevations will prevent the sliding of the intermediate layer 2 in the direction of the application of stress.

In the case of the embodiment according to FIG. 2 where a pull-off speed of the U-shaped metal rail is 22 mm/min, the pull-off forces are increased by approximately 50%.

The raised bodies may be advantageously roughened by mechanical or chemical means if further increased friction is desired.

We claim:
1. A framed glass pane comprising:
   (a) a glass pane;
   (b) a frame press-fit on at least one marginal area of the glass pane, said frame comprising:
      (1) a U-shaped profile rail, and
      (2) an elastically resilient material disposed within the rail along the sides and bottom of the U-shaped profile for direct engagement with the marginal area of the glass pane to produce said press-fit; and

(c) a plurality of raised bodies on at least one surface of the glass pane within said marginal area, each of said bodies having:
  (1) a height dimension sufficient to embed into the elastic resilient material when said frame is press-fit thereon to prevent relative sliding movement of the frame and glass pane in the direction of forces applied to the frame under normal operating conditions, and
  (2) a substantially low and regular profile above the surface of said glass pane to permit initial relative sliding movement of the glass pane relative to the elastically resilient material during press-fitting of the frame onto the marginal area of the glass pane without destructive deformation of the resilient material.

2. A framed glass pane according to claim 1, wherein the raised bodies anchored into the surface of the glass have a width between about 0.5 mm and 2 mm and a height between about 0.2 mm and 0.5 mm.

3. A framed glass pane according to claim 2, wherein the raised bodies are striplike or punctiform in shape.

4. A framed glass pane according to claim 3, wherein the raised bodies are made of a fired-on ceramic material.

5. A framed glass pane according to claim 4, wherein
said glass pane on which said frame is press-fit includes thermally treated glass; and
said fired-on ceramic material is a material which has been thermally treated substantially at the same temperature as said thermally treated glass.

6. A framed glass pane according to claim 5, wherein said thermally treated glass is a bent glass which has been bent as a result of said thermal treatment.

7. A framed glass pane according to claim 5, wherein said thermally treated glass is a prestressed glass which has been prestressed as a result of said thermal treatment.

* * * * *